United States Patent
Tsou et al.

(10) Patent No.: US 10,348,208 B2
(45) Date of Patent: Jul. 9, 2019

(54) POWER CONTROLLERS AND CONTROL METHODS THEREOF FOR SWITCHING MODE POWER SUPPLIES

(71) Applicant: Leadtrend Technology Corporation, Hsinchu (TW)

(72) Inventors: Ming Chang Tsou, Hsinchu (TW); Meng Jen Tsai, Hsinchu (TW)

(73) Assignee: LEADTREND TECHNOLOGY CORPORATION, Hsinchu (TW)

(*) Notice: Subject to any disclaimer, the term of this patent is extended or adjusted under 35 U.S.C. 154(b) by 678 days.

(21) Appl. No.: 14/532,966

(22) Filed: Nov. 4, 2014

(65) Prior Publication Data
US 2015/0124491 A1   May 7, 2015

Related U.S. Application Data

(60) Provisional application No. 61/899,962, filed on Nov. 5, 2013.

(51) Int. Cl.
*H02M 3/335* (2006.01)
*H02M 1/00* (2006.01)

(52) U.S. Cl.
CPC ............ *H02M 3/33507* (2013.01); *H02M 2001/0022* (2013.01)

(58) Field of Classification Search
CPC ......... H02M 3/33507; H02M 3/33523; H02M 3/335; H02M 3/33515; H02M 3/1563; H02M 3/3385; H02M 3/33561; H02M 3/1584; H02M 3/157; H02M 7/10; H02M 7/06; H02M 7/068; H02M 7/217; H02M 7/219; H02M 7/12; H02M 7/7575; H02M 7/525; H02M 7/53871; H02M 7/493; H02M 1/32; H02M 1/4208; H02M 1/4233; H02M 1/4225; H02M 1/324258; H02M 5/4585
USPC ......... 363/21.12–21.13, 21.15, 21.17–21.18, 363/78–79, 81, 84, 125–126
See application file for complete search history.

(56) References Cited

U.S. PATENT DOCUMENTS

| | | | |
|---|---|---|---|
| 6,944,034 B1 * | 9/2005 | Shteynberg | H02M 1/4258 323/282 |
| 9,893,609 B1 * | 2/2018 | Feno | H02M 1/4241 |
| 2006/0220938 A1 * | 10/2006 | Leung | H02M 3/33515 341/155 |
| 2009/0016082 A1 * | 1/2009 | Miftakhutdinov | H02M 3/33507 363/20 |

(Continued)

*Primary Examiner* — Jue Zhang
*Assistant Examiner* — Kevin H Sprenger
(74) *Attorney, Agent, or Firm* — McClure, Qualey & Rodack, LLP

(57) ABSTRACT

Herein is disclosed a control method suitable for a switching mode power supply. A power switch is controlled according to a clock signal to transfer electrical energy from an input power source to an output power source. A feedback signal is provided in response to an output voltage of the output power source. A clock signal is generated in response to the feedback signal and an input voltage of the input power source. The clock signal has a clock frequency determining a switching frequency of the power switch. When the feedback signal exceeds a relatively-high level, the clock frequency increases in response to decrease to the input voltage. When the feedback signal is below a relatively low level, the clock frequency is independent from the input voltage.

18 Claims, 3 Drawing Sheets

(56) References Cited

U.S. PATENT DOCUMENTS

| | | | |
|---|---|---|---|
| 2009/0184699 A1* | 7/2009 | Natsume | H02M 3/158 323/282 |
| 2010/0321956 A1* | 12/2010 | Yeh | H02M 3/33507 363/16 |
| 2012/0043954 A1* | 2/2012 | Lin | H02M 3/33507 323/284 |
| 2015/0078050 A1* | 3/2015 | Colbeck | H02M 7/066 363/126 |

* cited by examiner

POWER CONTROLLERS AND CONTROL METHODS THEREOF FOR SWITCHING MODE POWER SUPPLIES

CROSS-REFERENCE TO RELATED APPLICATION

This application claims priority to and the benefit of U.S. Provisional Application No. 61/899,962 filed on Nov. 5, 2013, which is incorporated by reference in its entirety.

BACKGROUND

The present disclosure relates generally to control methods and apparatuses for determining a clock frequency of a switching mode power supply.

In addition to generating output power sources fulfilling required specifications such as regulated output voltage, current, power, etc. every power supply should be capable of protecting itself from damages caused by abnormal operations. For example, power supplies in the art are commonly equipped with means for over voltage protection (OVP), over current protection (OCP), over load protection (OLP), over temperature protection (OTP), and the like.

As eco-friendly topics have been continuously attracting focuses all over the world, power conversion efficiency of power supplies is always a concern and is constantly been required to improve all the time. For example, the US Department of Energy (DOE) has issued a final rule on energy efficiency level VI for power supplies, and demands the minimum energy efficiency requirement stricter than the requirement in the level V of International Efficiency Marking Protocol. Generally speaking, power supply manufactures normally endeavor to make their products comply the newest requirement, because of not only the demonstration of their willing to make a friendly environment, but also the exhibition of advanced technology involved.

SUMMARY

Embodiments of the present invention disclose a control method suitable for a switching mode power supply. A power switch is controlled according to a clock signal to transfer electrical energy from an input power source to an output power source. A feedback signal is provided in response to an output voltage of the output power source. A clock signal is generated in response to the feedback signal and an input voltage of the input power source. The clock signal has a clock frequency determining a switching frequency of the power switch. When the feedback signal exceeds a relatively high level, the clock frequency increases in response to decrease to the input voltage. When the feedback signal is under a relatively low level, the clock frequency is independent from the input voltage.

Embodiments of the present invention further disclose a power controller suitable for controlling a power switch in a switching mode power supply. The power switch controls a conduction current through an inductive device connected to an input power source. The power controller comprises a detection node, an input power source detection circuit, a feedback node, and a clock generator. The detection node is coupled to the input power source. The input power source detection circuit is connected to the detection node, and detects an input voltage of the input power source to generate a detection result. A feedback signal is provided at the feedback node in response to an output voltage of an output power source. The clock generator generates a clock signal in response to the detection result and the feedback signal. The clock signal has a clock frequency, and causes the inductive device periodically transferring energy from the input power source to the output power source. When the feedback signal exceeds a relatively high level, the clock frequency increases in response to decrease to the input voltage. When the feedback signal is under a relatively low level, the clock frequency is independent from the input voltage.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

One way to comply with the energy efficiency level VI for conventional power supplies is slightly increase the inductance of the transformer used in the power supplies. Nevertheless, the increment in inductance could result in the risk of magnetic saturation, especially in the condition when the magnitude of an alternating-current (AC) input power source is as low as 90 VAC and the OCP happens at the same time.

In an embodiment of the invention, a power supply transfers electrical energy from an input power source to an output power source, to power a load. A power controller in the power supply controls a power switch. A clock signal generated in the power controller periodically causes the power switch to be turned ON. The clock signal is in response to a feedback signal and an input voltage of the input power source, where the feedback signal is controlled by an output voltage of the output power source. When the feedback signal is high, indicating the load is heavy, a clock frequency of the clock signal decreases if the input voltage increases. Under the same load, the increment of the clock frequency could decrease the peak current through a transformer and reduce the risk of magnetic saturation. When the feedback signal is low, indicating a light load or no load, the clock frequency is low and about a constant independent from the input voltage of the input power source. Low clock frequency can reduce switching loss in the power switch, and improves the energy efficiency when driving a light load or no load.

Even though the embodiments of the invention are demonstrated by power supplies with a flyback topology, this invention is not limited to. The invention could be embodied in, for example, buck converters, boosters, or buck-booster converters.

Figure 1:
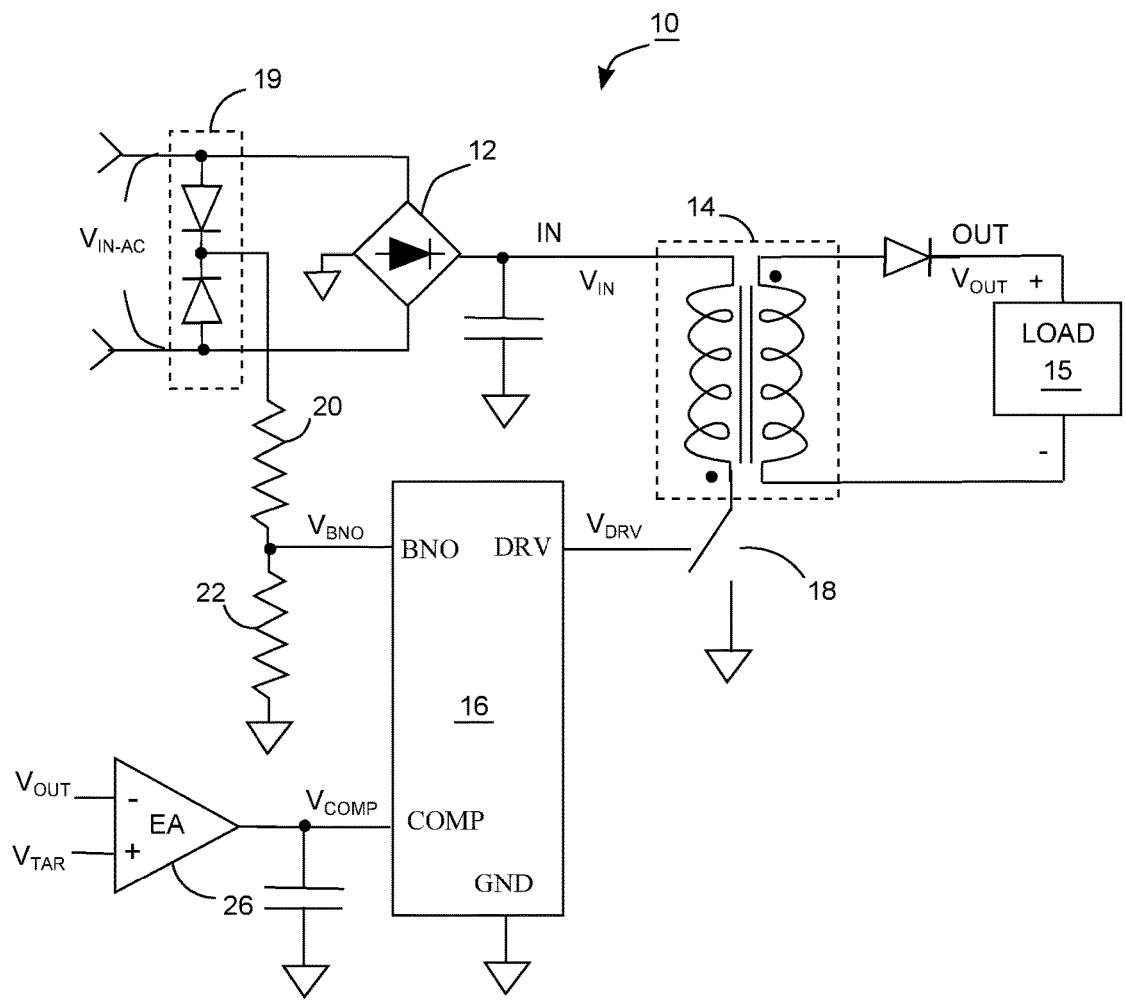
FIG. 1 shows a switching mode power supply according to embodiments of the invention.

FIG. 1 shows a switching mode power supply 10 according to embodiments of the invention, including a bridge rectifier 12, a transformer 14, a power controller 16, and a power switch 18. The bridge rectifier 12 could perform full-wave or half-wave rectification, to generate a direct-current (DC) input power source IN. In this embodiment, the input voltage $V_{IN}$ of the DC input power source IN is about a constant, unchanged over time. In other embodiments, the waveform of the input voltage $V_{IN}$ could be a rectified sinusoidal wave, varying over time. The power controller 16, through a driving node DRV, periodically turns the power switch 18 ON and OFF, to make the transformer 14 store electrical energy from the input power source IN and release the stored energy to the output power source OUT, which powers the load 15. An error amplifier 26 compares an output voltage $V_{OUT}$ of the output power source OUT with a target voltage $V_{TAR}$, and accordingly provides a feedback signal $V_{COMP}$, also referred to be a compensation signal in the art. In one embodiment, the error amplifier 26 could include a photo-coupler that provides DC isolation between the input power source IN and the output power source OUT. In another embodiment, the error amplifier 26 detects the output voltage $V_{OUT}$ in the secondary side by detecting the reflective voltage across an auxiliary winding in the primary side.

The power controller 16 modulates the duty cycle of the driving signal $V_{DRV}$ at the driving node DRV. The duty cycle refers to the ratio of an ON time (when the power switch 18 is turned ON) to a cycle time (the duration of a switching cycle).

The power controller 16 detects the magnitude of the AC input voltage $V_{IN-AC}$ at the AC input power source, via brownout node BNO, resistor 22 and resistor 20, and rectifier 19. For instance, if the power controller 16 finds the detection voltage $V_{BNO}$ at the brownout node BNO has continued to be under a predetermined brownout voltage for a certain period of time, it treats the finding as an indication of a brownout event and forces the power switch 18 to be constantly OFF, stopping energy conversion.

In one embodiment, the power controller 16 has a clock generator generating a clock signal in response to the feedback signal $V_{COMP}$ and the detection voltage $V_{BNO}$.

Figure 2:
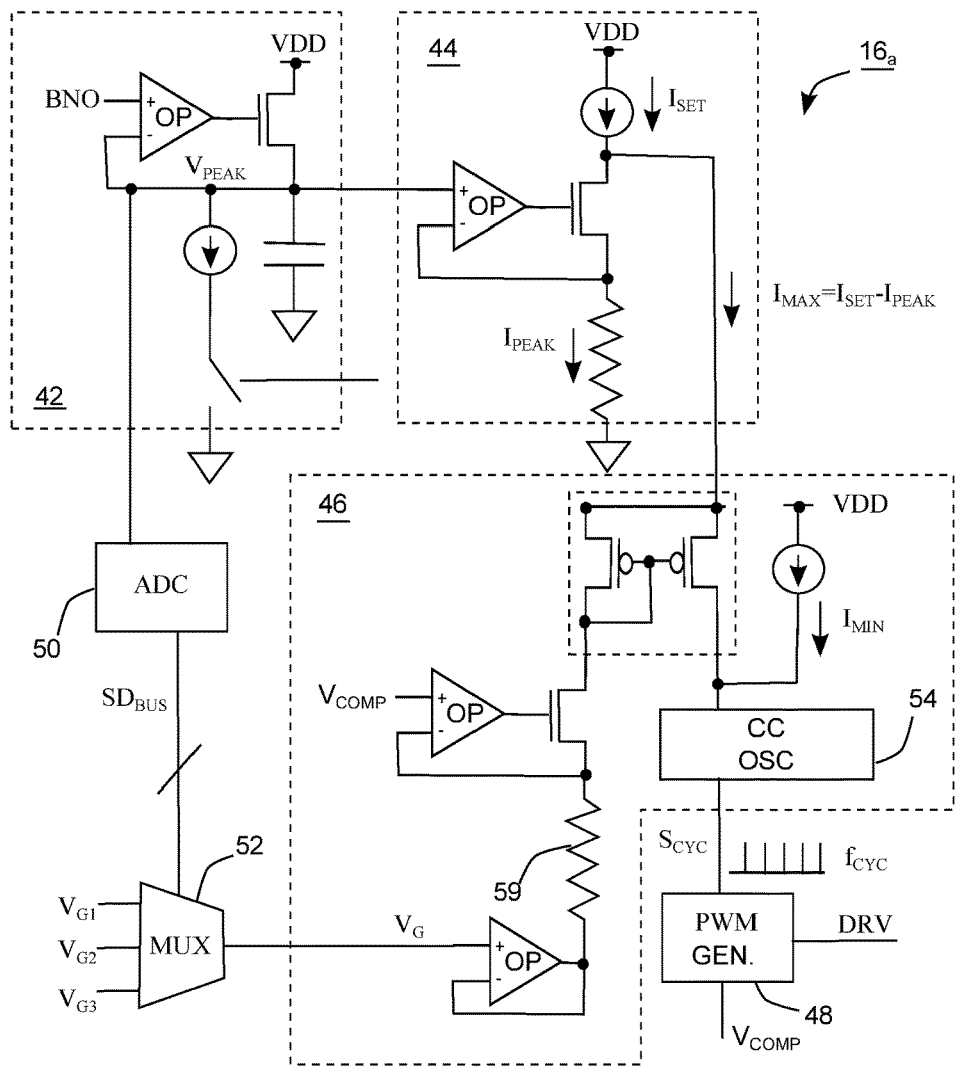
FIG. 2 demonstrates a power controller.

FIG. 2 demonstrates a power controller $16_a$, including a peak detector 42, a voltage-to-current converter 44, a clock generator 46, and a pulse-width-modulation (PWM) generator 48.

The peak detector 42 is a kind of input power source detection circuit, connected to the brownout node BNO to generate voltage signal $V_{PEAK}$ by detecting the peak voltages of the detection voltage $V_{BNO}$ equivalent to the peak voltages of the AC input voltage $V_{IN-AC}$. The voltage signal $V_{PEAK}$ substantially represents a peak voltage of the AC input voltage $V_{IN-AC}$. A constant current source in the peak detector 42 slightly lowers the voltage signal $V_{PEAK}$ once every very long period of time, 16 ms for example, so that the voltage signal $V_{PEAK}$ faithfully tracks or represents the peak voltages of the AC input voltage $V_{IN-AC}$.

The voltage-to-current converter 44 generates a current $I_{PEAK}$ in proportion to the voltage signal $V_{PEAK}$. The maximum current $I_{MAX}$ equals to a predetermined setting current $I_{SET}$ minus the current $I_{PEAK}$. Accordingly, the maximum current $I_{MAX}$ decreases if the voltage signal $V_{PEAK}$ increases.

An analog-to-digital converter 50 converts the voltage signal $V_{PEAK}$ into several digital selection signals $SD_{BUS}$, which selects one of several predetermined voltages $V_{G1}$, $V_{G2}$ and $V_{G3}$ to be output as a turning voltage $V_G$.

The clock generator 46 generates a clock signal $S_{CYC}$ with a clock frequency $f_{CYC}$, based on the maximum current $I_{MAX}$, the feedback signal $V_{COMP}$, and the turning voltage $V_G$. According to circuit analysis to FIG. 2, when the feedback signal $V_{COMP}$ is below the turning voltage $V_G$, there will be only the constant minimum current $I_{MIN}$ inputted into the current-controlled oscillator 54, such that the clock frequency $f_{CYC}$ is constant and independent from the maximum current $I_{MAX}$ or the voltage signal $V_{PEAK}$. Further analysis to the FIG. 2 shows that, when the feedback signal $V_{COMP}$ is high enough to exceed a predetermined relatively-high level, the input current into the current-controlled oscillator 54 will reach a maximum value, which equals to the summation of the constant minimum current $I_{MIN}$ and a fixed portion of the maximum current $I_{MAX}$. Accordingly, when the feedback signal $V_{COMP}$ exceeds the predetermined relatively-high level, once the voltage signal $V_{PEAK}$ increases, the maximum current $I_{MAX}$ decreases, the current inputted to the current-controlled oscillator 54 decreases, so that the clock frequency $f_{CYC}$ reduces.

In one embodiment, the PWM generator 48 drives the driving node DRV to turn ON the power switch 18 once every switch cycle, the reciprocal of the clock frequency $f_{CYC}$. An ON time, the duration when the power switch 18 is kept as ON in a cycle time, is determined by the feedback signal $V_{COMP}$. For example, the larger the feedback signal $V_{COMP}$, the longer the ON time. In one embodiment, the clock frequency $f_{CYC}$ is also equal to the switching frequency of the power switch 18.

Figure 3:
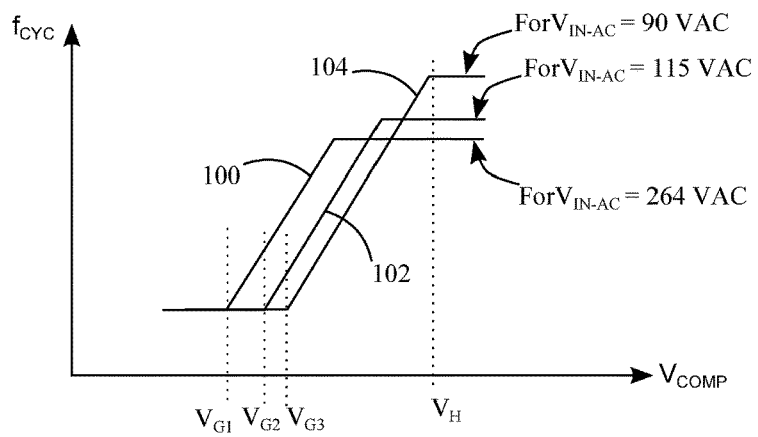
FIG. 3 illustrates the relationships between the feedback signal $V_{COMP}$ and the clock frequency $f_{CYC}$ under different AC input voltages, resulted from the operation of the power controller in FIG. 2.

FIG. 3 illustrates the relationships between the feedback signal $V_{COMP}$ and the clock frequency $f_{CYC}$ under different AC input voltages, for the operation of the power controller $16_a$. FIG. 3 has three curves 100, 102 and 104, corresponding to AC input voltages of 264 VAC, 115 VAC and 90 VAC, respectively. Each curve has a tilted portion parallel to the tilted portion of another curve, because the resistor 59 stays unchanged when the magnitude of AC input voltage $V_{IN-AC}$ changes. The magnitude of AC input voltage $V_{IN-AC}$ could influence the values of the turning voltage $V_G$ and the maximum current $I_{MAX}$ though. The curve 100, for instance, shows the correlation between the feedback signal $V_{COMP}$ and the clock frequency $f_{CYC}$ when the AC input voltage $V_{IN-AC}$ is 264 VAC. The AC input voltage $V_{IN-AC}$ of 264 VAC causes the multiplexer 52 to select the predetermined voltage $V_{G1}$ as the turning voltage $V_G$. As shown in FIG. 3, when the feedback signal $V_{COMP}$ is below the predetermined voltage $V_{G1}$, the curve 100 is flat, meaning the clock frequency $f_{CYC}$ is a constant independent from the feedback signal $V_{COMP}$. The curve 100 is flat again when the feedback signal $V_{COMP}$ exceeds the predetermined voltage $V_H$ shown in FIG. 3.

Also shown in FIG. 3 is that all three curves 100, 102 and 104 merge together if the feedback signal $V_{COMP}$ is under the predetermined voltage $V_{G1}$. In other words, the clock frequency $f_{CYC}$ is independent from the magnitude of AC input voltage $V_{IN-AC}$ when the feedback signal $V_{COMP}$ is under the predetermined voltage $V_{G1}$. Furthermore, when the feedback signal $V_{COMP}$ is about the predetermined voltage $V_H$ or higher, the curve 100 (corresponding to the AC input voltage $V_{IN-AC}$ of 264 VAC) has the lowest clock frequency while the curve 104 (corresponding to the AC input voltage $V_{IN-AC}$ of 90 VAC) has the highest clock frequency. In other words, if the feedback signal $V_{COMP}$ is about the predetermined voltage $V_H$, the clock frequency $f_{CYC}$ increases as the magnitude of AC input voltage $V_{IN-AC}$ decreases.

As magnetic saturation could easily happen under OCP when the AC input voltage $V_{IN-AC}$ is 90 VAC, the increment of the clock frequency following the decrease of the magnitude of AC input voltage $V_{IN-AC}$ could reduce the peak current through a transformer, so as to reduce the risk of magnetic saturation as well.

Figure 4:
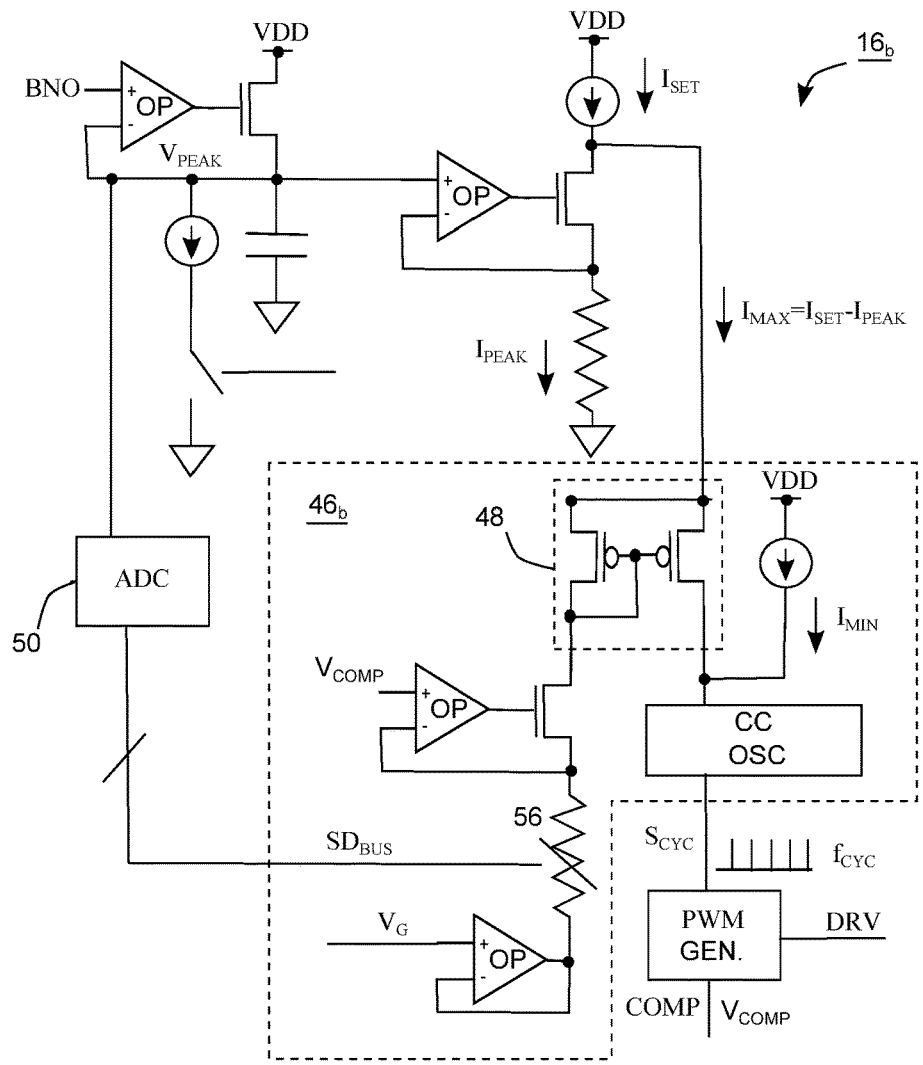
FIG. 4 shows another power controller.

FIG. 4 shows another power controller $16_b$, portions of which are not detailed for brevity because of the similarity between the power controller $16_b$ and the power controller $16_a$. Different from the analog-to-digital converter 50 of the power controller $16_a$, what the analog-to-digital converter 50 of the power controller $16_b$ controls is the resistance of variable resistor 56. For example, the resistance of the variable resistor 56 for the AC input voltage $V_{IN-AC}$ of 264 VAC is different from that for the AC input voltage $V_{IN-AC}$ of 90 VAC.

Figure 5:
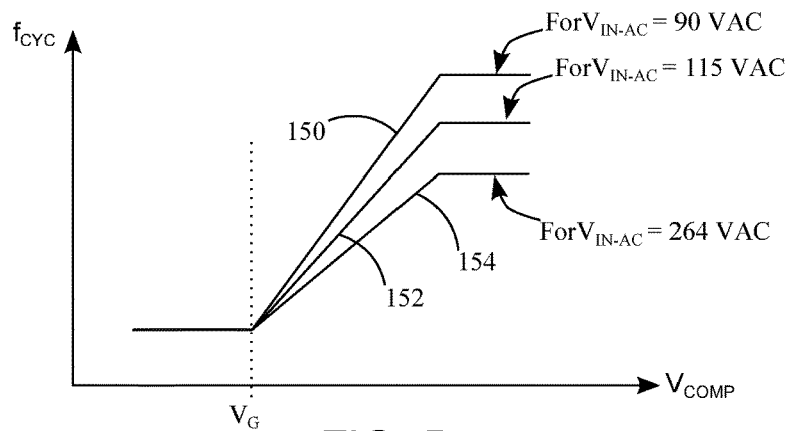
FIG. 5 illustrates the relationships between the feedback signal $V_{COMP}$ and the clock frequency $f_{CYC}$ under different AC input voltages, resulted from the operation of the power controller in FIG. 4.

FIG. 5 illustrates the relationships between the feedback signal $V_{COMP}$ and the clock frequency $f_{CYC}$ under different AC input voltages, resulted from the operation of the power controller $16_b$. FIG. 5 has three curves 154, 152 and 150, corresponding to AC input voltages of 264 VAC, 115 VAC and 90 VAC, respectively. These three curves 154, 152 and 150 merge together when the feedback signal $V_{COMP}$ is below the turning voltage $V_G$. As long as the feedback signal $V_{COMP}$ increases from the turning voltage $V_G$, the three curves 154, 152 and 150 separate into three tilted portions with different slopes. As shown in FIG. 5, the tilted portion of the curve 150 ramps up quicker than the ones of the curves 154 and 152 do, because the AC input voltages of 90 VAC (corresponding to the curve 150) causes the variable resistor 56 to have relatively-smaller resistance, such that the tilted portion of the curve 150 is the steepest among all the three tilted portions.

Also shown in FIG. 5 is that the clock frequency $f_{CYC}$ is independent from the AC input voltage $V_{IN-AC}$ when the feedback signal $V_{COMP}$ is under the turning voltage $V_G$. Furthermore, when the feedback signal $V_{COMP}$ is high enough, the clock frequency $f_{CYC}$ decreases as the AC input voltage $V_{IN-AC}$ increases.

In another embodiment, the analog-to-digital converter 50 in a power controller could determine both the resistance of the variable resistor 56 and the value of the turning voltage $V_G$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method suitable for a switching mode power supply, the control method comprising:
controlling a power switch according to a clock signal, to transfer electrical energy from an input power source to an output power source;
providing a feedback signal in response to an output voltage of the output power source; and
generating the clock signal in response to the feedback signal and an input voltage of the input power source, wherein the clock signal has a clock frequency determining a switching frequency of the power switch;
wherein when the feedback signal exceeds a first predetermined level, the clock frequency increases in response to decrease to the input voltage; and
when the feedback signal is under a second predetermined level lower than the first predetermined level, the clock frequency is independent from the input voltage.

2. The control method as claimed in claim 1, further comprising:
generating the clock signal based on a turning voltage and the feedback signal;
wherein when the feedback signal is below the turning voltage the clock frequency is independent from the feedback signal.

3. The control method as claimed in claim 1, further comprising:
detecting a peak voltage of the input voltage; and
generating the clock signal in response to the peak voltage;
wherein when the feedback signal exceeds the first predetermined level, the clock frequency increases as the peak voltage decreases; and
when the feedback signal is under the second predetermined level, the clock frequency is independent from the peak voltage.

4. The control method as claimed in claim 3, further comprising:
selecting, based on the peak voltage, one of several predetermined voltages as a turning voltage; and
generating the clock signal based on the turning voltage and the feedback signal;
wherein when the feedback signal is below the turning voltage the clock frequency is independent from the feedback signal.

5. The control method as claimed in claim 3, further comprising:
determining, in response to the peak voltage, resistance of a variable resistor; and
generating the clock signal based on a turning voltage, the variable resistor and the feedback signal;
wherein when the feedback signal is below the turning voltage the clock frequency is independent from the feedback signal.

6. The control method as claimed in claim 5, further comprising:
converting the peak voltage into digital selection signals; and
determining the resistance based on the digital selection signals.

7. The control method as claimed in claim 3, further comprising:
converting the peak voltage into a control current;
wherein the control current determines a maximum of the clock frequency.

8. The control method as claimed in claim 3, wherein when the feedback signal exceeds the first predetermined level, the clock frequency is independent from the feedback signal.

9. The control method as claimed in claim 1, comprising:
comparing the output voltage with a target voltage to generate the feedback signal.

10. The control method as claimed in claim 1, wherein the clock frequency is determined in response to the feedback signal and the input voltage.

11. A power controller, suitable for controlling a power switch in a switching mode power supply, wherein the power switch controls a conduction current through an inductive device connected to an input power source, the power controller comprising:

a detection node, for being coupled to the input power source;

an input power source detection circuit, connected to the detection node, for detecting an input voltage of the input power source to generate a detection result;

a feedback node, at which a feedback signal is provided in response to an output voltage of an output power source; and a clock generator, generating a clock signal in response to the detection result and the feedback signal, wherein the clock signal has a clock frequency, and causes the inductive device periodically transferring energy from the input power source to the output power source;

wherein when the feedback signal exceeds a first predetermined level, the clock frequency increases in response to decrease to the input voltage; and when the feedback signal is under a second predetermined level lower than the first predetermined level, the clock frequency is independent from the input voltage.

12. The power controller as claimed in claim 11, wherein the input power source detection circuit is a peak detector generating the detection result corresponding to a peak voltage of the input voltage.

13. The power controller as claimed in claim 12, further comprising:

a voltage-to-current converter, for converting the peak voltage to a control current which determines a maximum of the clock frequency.

14. The power controller as claimed in claim 12, further comprising:

an analog-to-digital converter, for converting the peak voltage to digital selection signals; and a multiplexer for selecting, based on the digital selection signals, one of several predetermined voltages to be a turning voltage;

wherein when the feedback signal is below the turning voltage the clock frequency is independent from the feedback signal.

15. The power controller as claimed in claim 12, further comprising:

an analog-to-digital converter, for converting the peak voltage to digital selection signals;

wherein the clock generator comprises a variable resistor with resistance controlled by the digital selection signals, the clock generator generates the clock signal based on the resistance, a turning voltage and the feedback signal, and when the feedback signal is below the turning voltage the clock frequency is independent from the feedback signal.

16. The power controller as claimed in claim 12, wherein when the feedback signal exceeds the first predetermined level, the clock frequency increases as the detection result decreases, and is independent from the feedback signal.

17. The power controller as claimed in claim 11, wherein the feedback signal is provided by comparing the output voltage with a target voltage.

18. The power controller as claimed in claim 11, wherein the clock frequency is determined in response to the feedback signal and the input voltage.

* * * * *